United States Patent [19]

Findeisen et al.

[11] 3,862,168
[45] Jan. 21, 1975

[54] 1,2,4-OXADIAZOLES

[75] Inventors: Kurt Findeisen; Kuno Wagner; Hans Holtschmidt, all of Leverkusen, Germany

[73] Assignee: Bayer Aktiengesellschaft, Leverkusen, Germany

[22] Filed: Oct. 29, 1971

[21] Appl. No.: 194,005

[30] Foreign Application Priority Data
Nov. 5, 1970 Germany............................ 2054342

[52] U.S. Cl........... 260/307 G, 260/566 D, 260/999
[51] Int. Cl............................................. C07d 85/52
[58] Field of Search................................ 260/307 G

[56] References Cited
UNITED STATES PATENTS

| | | | |
|---|---|---|---|
| 3,192,103 | 6/1965 | Sousa et al............................ | 167/33 |
| 3,192,216 | 6/1965 | Gray et al........................ | 260/256.4 |
| 3,227,725 | 1/1966 | Eloy et al............................. | 260/307 |

*Primary Examiner*—Raymond V. Rush
*Attorney, Agent, or Firm*—Burgess, Dinklage & Sprung

[57] ABSTRACT

Substituted oxadiazoles useful in the pesticide field having the general formula

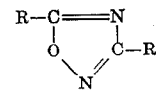

wherein R is chlorine or a radical selected from the group of aliphatic, cycloaliphatic, lower alkyl, lower haloalkyl, α-dichloromethyl isocyanide dichloride, aryl, substituted aryl, heterocyclic and substituted heterocyclic are prepared by reacting a compound having the formula

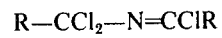

with hydroxylamine or a salt thereof at 0° to 200°C.

12 Claims, No Drawings

1,2,4-OXADIAZOLES

BACKGROUND

This invention relates to 1, 2, 4-oxadiazoles and to a process for their production.

SUMMARY

It has surprisingly been found that 1, 2, 4-oxadiazoles can be obtained in a smooth reaction and in high yields by reacting a compound corresponding to the general formula $$R-CCP_2-N = CCl-R$$

wherein the symbols R, which can be the same or different each represents a chlorine atom, an aliphatic radical having 1 to 8 carbon atoms, or a cycloaliphatic radical, a lower alkyl radical, an α-dichloromethyl isocyanide dichloride radical, an aryl radical and such aryl radical being substituted by halogen, alkyl-, alkoxy- or nitro, a 5- or 6-membered heterocyclic radical or such heterocyclic radical being substituted by halogen-, alkyl-, alkoxy- or nitro, with hydroxylamine or a hydroxylamine salt at a temperature in the range from 0° to 200°C.

DESCRIPTION

The reaction is best carried out in the presence of an inert organic solvent. The process according to the invention can, of course, also be carried out in the presence of a base as acid acceptor.

In the practical application of the process according to the invention, it has proved to be of advantage, when a substituted 1,3,3-trichloro-2-aza-propene is used, to work at a temperature in the range from 60° to 200°C and, more particularly, at a temperature of from 60° to 160°C.

When an α-substituted α-dichloro isocyanide dichloride is used for the process, which is preferably the case, a temperature in the range from 60° to 160°C, more particularly in the range from 70° to 110°C, is preferred.

In the context of the invention, lower aliphatic radicals (R) are those containing 1 to 8, more particularly 1 to 4, carbon atoms. Naturally, aliphatic radicals also include cycloaliphatic radicals, preferably having 5 or 6 carbon atoms in the ring system. In addition to the naphthyl radical, the phenyl radical is a preferred example of an optionally substituted aryl radical (R). Preferred halogen substituents on the aromatic radical include chlorine and bromine, whilst lower alkyl and alkoxy groups preferably have 1 to 4 carbon atoms. Lower haloalkyl means $C_{1-4}$, preferably $C_{2-4}$.

5- or 6-membered heterocyclic radicals optionally substituted by halogen (fluorine, chlorine or bromine) are preferably those which contain nitrogen, oxygen or sulphur as hetero atoms in the heterocyclic ring system. The heterocyclic ring systems can of course contain both a nitrogen atom and an oxygen atom or a sulphur atom, or an oxygen atom or sulphur atom as the only hetero atom. Naturally, the heterocyclic ring system can also contain nitrogen atoms only or nitrogen atoms together with an oxygen atom or sulphur atom and in addition can be anellated with a benzene ring system. The heterocyclic ring system can of course also carry the halogen atom on the benzene nucleus, although in addition both the benzene nucleus and also the heterocyclic ring itself can optionally be substituted by lower alkoxy groups or by nitro groups.

The starting compounds used for the process according to the invention are known and can be obtained by known methods (Angewandte Chemie, 74, page 848 (1962); Liebigs Annalen der Chemie, 701, pages 107 – 116 (1967). The following are examples of starting compounds: 1,3-bis-(trichloroethyl)-1,3,3-trichloro-2-aza-propene; 1-phenyl-1,3,3,3-tetrachloro-2-aza-propene; 1-trichloroethyl-3-phenyl-1,3,3-trichloro-2-aza-propene; 1-phenyl-3-trichloroethyl-1,3,3-trichloro-2-aza-propene; 1-trichloromethyl-3-(2'-chlorophenyl)-, 1-trichloromethyl-3-(3'-chlorophenyl)- and 1-trichloromethyl-3-(4'-chlorophenyl)-1,3,3-trichloro-2-aza-propene; 1-trichloromethyl-3-(3',4'-dichlorophenyl)- and 1-trichloromethyl-3-(2',6'-dichlorophenyl)-1,3,3-trichloro-2-aza-propene; 1,3-bis-(trichloromethyl)-1,3,3-trichloro-2-aza-propene; 3-trichloromethyl-1-pentachloroethyl-1,3,3-trichloro-2-aza-propene; or 1-pentachloroethyl-1,3,3,3-tetrachloro-2-aza-propene.

The α-substituted α-dichloro isocyanide dichlorides preferably used for the process according to the invention are also known and can be obtained by known methods [Angewandte Chemie 79, pages 663 – 680 (1967) and Angewandte Chemie 80, pages 942 – 953 (1968)]. The following are examples of such compounds: trichloromethyl isocyanide dichloride; 1,1-dichloro-2-chloroethyl isocyanide dichloride; pentachloroethyl isocyanide dichloride; 3-phenyl-1,1,3,3-tetrachloro-2-aza-propene (phenyl-dichloromethyl isocyanide dichloride); or tetrachloroethyl diisocyanide dichloride.

The process is readily carried out by combining the reaction components. A molar ratio of 1:1 is generally preferred. The reaction is preferably carried out in the presence of an inert organic solvent, for example, chloroform, carbon tetrachloride, tri- and perchloroethylene, chlorobenzene, dichlorobenzene, nitrobenzene, dioxan, sulpholan, benzene or toluene, or even in the presence of mixtures of the aforementioned solvents. The hydrochloric acid liberated during the reaction escapes from the system, and the end of the reaction is reflected in an abatement in the evolution of hydrogen chloride. The hydrogen chloride liberated can also of course be absorbed by acid-binding agents such as tertiary bases, for example triethylamine, N,N-dimethyl cyclohexylamine, N,N-dimethyl aniline, and N,N-dimethyl benzylamine, or even inorganic bases, such as alkali metal or alkaline earth metal carbonates.

The reaction can be carried out at ambient pressure, although it can also be carried out in an autoclave in which case the hydrochloric acid formed is vented.

The hydroxylamine used for the reaction can be added in the form of the free base, although it is preferably added in the form of its standard commercial salts (hydrochloride in particular). The reaction mixtures are worked up in the usual way.

The process is illustrated with reference to the following Example:

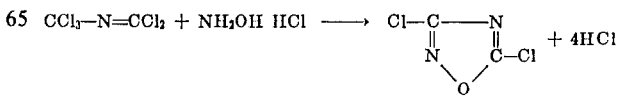

The compounds obtainable by the process according to the invention correspond to the general formula

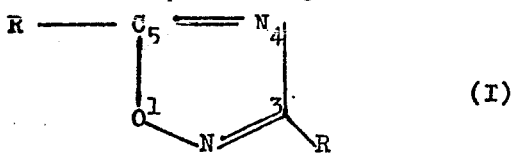

(I)

in which R has the meaning given above.

The new compounds obtainable by our process correspond to the general formula

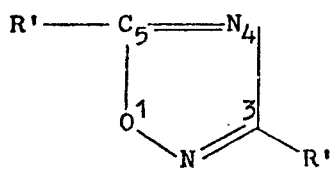

each represents a chlorine atom, a lower $C_{1-4}$ aliphatic-, 5- or 6-membered cycloaliphatic-, a lower $C_{2-4}$ haloalkyl radical, —$CHCl_2$, —$CH_2Cl$, a 1,2,4-oxadiazolyl radical and whereby if one radical R' stands for chlorine the other can be trichloromethyl.

The new 3,5-dichloro-1,2,4-oxadiazole may be regarded as a particularly preferred compound.

The compounds obtainable by the process according to the invention are either very difficult or impossible to obtain by other methods, and are valuable intermediate products for the production of pesticides (U.S. Pat. No. 3,264,318) dyes and plastics and are themselves also active in the aforementioned fields, especially in the pesticide field.

The fact that the process according to the invention can be carried out at all must be regarded as particularly surprising, because substituted trichloro-2-aza-alkenes are highly reactive compounds which react violently and often uncontrollably with nucleophilic reagents. The preferred embodiment of the process according to the invention, in which an α-dichloroisocyanide dichloride is used, must also be regarded as particularly surprising, because the formation of hydroxy guanidines (German Pat. No. 1,170,931) and of carbodiimides (DAS No. 1,149,712) has been expected.

The temperatures quoted in the following Examples are given in °C. The examples are intended to further illustrate this invention without limiting same in any manner.

EXAMPLE 1

107.5 g of trichloromethyl isocyanide dichloride, 100 ml of sulpholan and 34.7 g of hydroxylamine hydrocloride are introduced into a 250 ml-capacity 3-necked flask. The reaction mixture is heated to 120°C over a period of 30 minutes, during which a vigorous evolution of HCl begins. After 3 hours, a homogeneous solution is obtained and a vigorous reflux commences. The homogeneous solution is distilled at normal pressure.

63 g (90.5 percent of the theoretical) of 3,5-dichloro-1,2,4-oxadiazole are obtained. bp 100° – 112°C/760 Torr; $n_D^{20}$: 1.4653

EXAMPLE 2

50 g of pentachloroethyl isocyanide dichloride, 50 ml of sulpholan and 11.7 g of hydroxylamine hydrochloride are mixed at room temperature in a 250 ml 3-necked flask and heated to 85°C over a period of 25 minutes. The evolution of HCl gas begins at this temperature, and is over at 125°C. The cooled reaction mixture is fractionated in a water-jet vacuum.

31 g (86 percent of the theoretical) of 3-chloro-5-trichloromethyl-1,2,4-oxadiazole are obtained, bp 80°–86°C/16 Torr.

EXAMPLE 3

60 g of tetrachloroethyl diisocyanide dichloride, 100 ml of sulpholan, and 23.2 g of hydroxylamine hydrochloride are combined in a 250 ml 3-necked flask and gradually heated to 103°C. This produces a vigorous evolution of gas and the hydroxylamine hydrochloride dissolves. The resulting clear solution is cooled to room temperature, the mixture is stirred with water and the crystals obtained are filtered off with suction. The reaction product is purified by distillation or by recrystallisation from washing spirit.

26.5 g (77 percent of the theoretical) of 3,3'-chloro-5-bis-1,2,4-oxadiazole melting at 103°C are obtained.

EXAMPLE 4

64.2 g of N-(α-dichlorobenzyl)-isocyanide dichloride, 100 ml of o-dichlorobenzene and 17.4 g of hydroxylamine hydrochloride are introduced into a 250 ml 3-necked flask and heated slowly with stirring to 130°C, producing a vigorous evolution of hydrogen chloride. After 1 hour, the evolution of hydrogen chloride is over, and the cooled reaction mixture is fractionated under an oil pump vacuum.

33.5 g (74 percent of the theoretical) of 3-chloro-5-phenyl-1,2,4-oxadiazole are obtained; bp 118° – 125°C/14 Torr.

EXAMPLE 5

30 g of 1,1,3-trichloroethyl isocyanide dichloride, 30 ml of sulpholan and 9.1 of hydroxylamine hydrochloride are reacted at 100°C, as described in Example 4. The reaction product is recovered from the reaction mixture by distillation.

16.3 g (83 percent of the theoretical) of 3-chloro-5-chloromethyl-1,2,4-oxadiazole are obtained. bp 69° – 74°C/14 Torr.

EXAMPLE 6

38.2 g of 1,3-bis-(trichloromethyl)-1,3,3-trichloro-2-aza-propene, 30 ml of sulpholan and 7 g of hydroxylamine hydrochloride are heated to 130°C over a period of 30 minutes, producing a vigorous evolution of HCl gas. After the evolution of hydrogen chloride is over, the reaction product is distilled in a water-jet vacuum.

27.3 g (89.5 percent of the theorectical) of 3,5-bis-trichloromethyl-1,2,4-oxadiazole are obtained. bp 120° – 123°C/15 Torr.

EXAMPLE 7

46.5 g of 3-trichloromethyl-1-pentachloroethyl-1,3,3-trichloro-2-aza-propene, 100 ml of o-dichlorobenzene and 7 g of hydroxylamine hydrochloride are mixed in a 250 ml capacity 3-necked flask and heated to 130°C over a period of 40 minutes. The solution gradually becomes clear and the evolution of HCl gas is complete after approximately 2 hours. The reaction mixture is fractionally distilled.

29 g (74.5 percent of the theoretical) of 3-pentachloroethyl-5-trichloromethyl-1,2,4-oxadiazole are obtained. bp 175° – 180°C/15 Torr.

EXAMPLE 8

34 g of 1-phenyl-3-trichloromethyl-1,3,3-trichloro-2-aza-propene, 50 ml of sulpholan and 7 g of hydroxylamine hydrochloride are introduced into a 3-necked flask and slowly heated with stirring. The evolution of HCl gas begins at 120°C, after which the reaction mixture is heated to 130°C over a period of 30 minutes. After cooling, the clear solution is introduced into water and shaken with ether, and the ether phase is dried over sodium sulphate and concentrated in a rotary evaporator. The residue is fractionated.

21 g (80 percent of the theoretical) of 3-phenyl-5-trichloromethyl-1,2,4-oxadiazole are obtained. bp 96°–99°C/0.5 Torr; $n_D^{20}$:1.5690

Two compounds hitherto unreported in the literature can be obtained as follows in accordance with this invention.

163.5 g of dipropyl carbamic acid chloride are heated over a period of 1 hour in ultra-violet light to 100°C whilst chlorine is introduced. Chlorination is then continued under the following temperature conditions: 4.5 hours at 100° to 120°C; 3.5 hours at 140° to 160°C; 4 hours at 180° to 200°C; and 1 hour at 220°C. Following the addition of 1.5 g of ferric chloride, chlorination is then continued for another 4 hours at 180° to 200°C and then for 3 hours at 210° to 220°C. Nitrogen is then bubbled through the reaction mixture, after which it is distilled in an oil-pump vacuum. The distillate is fractionated in a column. 160 g of crude 1-pentachloro-ethyl-3-trichloromethyl-1,3,3-trichloro-2-aza-propene are obtained at 163° – 178°C/0.15 Torr, solidifying into colourless crystals on cooling. Crystals melting at 114°C are obtained by crystallisation from acetonitrile.

Chlorine is introduced in ultra-violet light into 100 g of propyl isothiocyanate. The temperature rises to 90°C in an exothermic reaction. Chlorination is then continued with gradual heating, initially for 5 hours at 100°C and then for 6 hours at 120° to 140°C in a descending condenser, the sulphur being removed by distilling off sulphur dichloride. The temperature is then increased to 220°C over a period of 15 hours, chlorination finally being continued for 5 hours at 225° to 230°C. The reaction mixture is fractionated in vacuo in a column. After first runnings consisting predominantly of pentachloroethyl isocyanide dichloride, 1-pentachloroethyl-1,3,3,3-tetrachloro-2-aza-propene distills at 125° – 130°C/0.4 Torr (yield 69 g). The compound crystallises on cooling into colourless crystals which melt at 45.5° – 46°C after crystallisation from acetonitrile.

What is claimed is:

1. Compounds according to claim 1 selected from the group of
3-chloro-5-trichloromethyl-1,2,4-oxadiazole;
3,3'-chloro-5-bis-1,2,4-oxadiazole;
3-chloro-5-chloromethyl-1,2,4-oxadiazole,
3-pentachloroethyl-5-trichloromethyl-1,2,4-oxadizaole; and
3,5-dichloro-1,2,4-oxadiazole.

2. Process for preparing a 1,2,4-oxadiazole which comprises reacting a compound having the formula

wherein each R is the same or different and is selected from the group of
chlorine;
lower alkyl;
lower haloalkyl;
phenyl;
phenyl substituted by halogen, lower alkyl or lower alkoxy; and
α-dichloromethyl isocyanide dichloride,
with hydroxylamine at a temperature of from 0 to 200°C.

3. Process of claim 2 wherein the hydroxylamine is used in the form of its hydrochloride salt.

4. Process of claim 2 wherein the reaction is carried out in the presence of an inert organic solvent.

5. Process of claim 4 wherein the solvent is selected from the group of chloroform, carbon tetrachloride, trichloroethylene, perchloroethylene, chlorobenzene, dichlorobenzene, nitrobenzene, dioxan, sulpholan, benzene, toluene, and mixtures of the foregoing.

6. Process of claim 5 wherein the solvent is sulpholan.

7. Process of claim 2 wherein α-dichloroisocyanide dichloride is a reactant and the temperature is from 60° to 160°C.

8. Process of claim 7 wherein the temperature is from 70° to 110°C.

9. Process of claim 7 wherein the α-dichloro isocyanide dichloride is selected from the group of trichloromethyl isocyanide dichloride; 1,1-dichloro-2-chloroethyl isocyanide dichloride; pentachloroethyl isocyanide dichloride; phenyl-dichloromethyl isocyanide dichloride; and tetrachloroethyl diisocyanide dichloride.

10. Process of claim 2 wherein a substituted 1,3,3-trichloro-2-aza-propene is a reactant and the temperature is from 60° to 200°C.

11. Process of claim 10 wherein the temperature is from 60° to 160°C.

12. Process of claim 10 wherein the substituted 1,3,3-trichloro-2-azapropene is selected from the group of 1,3-bis-(trichloroethyl)1,3,3-trichloro-2-aza-propene; 1-phenyl-1,3,3,3-tetrachloro-2-aza-propene; 1-trichloroethyl-3-phenyl-1,3,3-trichloro-2-aza-propene; 1-phenyl-3-trichloroethyl-1,3,3-trichloro-2-aza-propene; 1-trichloromethyl-3-(2'-chlorophenyl)-, 1-trichloromethyl-3-(3'-chlorophenyl)- and 1-trichloromethyl-3-(4'-chlorophenyl)-1,3,3-trichloro-2-aza-propene; 1-trichloromethyl-3-(3',4'-dichlorophenyl)- and 1-trichloromethyl-3-(2',6'-dichlorophenyl)-1,3,3-trichloro-2-aza-propene; 1,3-bis-(trichloromethyl)-1,3,3-trichloro-2-aza-propene; 3-trichloromethyl-1-pentachloroethyl-1, 3,3-trichloro-2-aza-propene; and 1-pentachloroethyl-1,3,3,3-tetrachloro-2-aza-propene.

* * * * *